United States Patent [19]

Hung

[11] Patent Number: 4,894,718
[45] Date of Patent: Jan. 16, 1990

[54] METHOD AND SYSTEM FOR TESTING VIDEO

[75] Inventor: Chan C. Hung, Hsin Chu, Taiwan
[73] Assignee: Acer Incorporated, China
[21] Appl. No.: 329,921
[22] Filed: Mar. 29, 1989
[51] Int. Cl.⁴ .......................................... H04N 17/04
[52] U.S. Cl. .................................... 358/139; 358/10
[58] Field of Search .............. 358/139, 10; 324/121 R
[56] References Cited

U.S. PATENT DOCUMENTS 4,772,948  9/1988  Irvin ..................................... 358/139
4,780,755 10/1988  Knierim ................................. 358/10
4,814,872  3/1989  Ivie ....................................... 358/139

Primary Examiner—Howard W. Britton
Attorney, Agent, or Firm—Townsend and Townsend

[57] ABSTRACT

A video signal testing method and the system thereof supplying video signals on a video connector into a cyclic redundancy check circuit through a delay circuit, generates a fixed value corresponding to the specified testing full-frame. The generated value is stored in a RAM of unit under test and compared with a previous built-in value to justify the correctness of the video signals without the aid of human naked eyes.

2 Claims, 3 Drawing Sheets

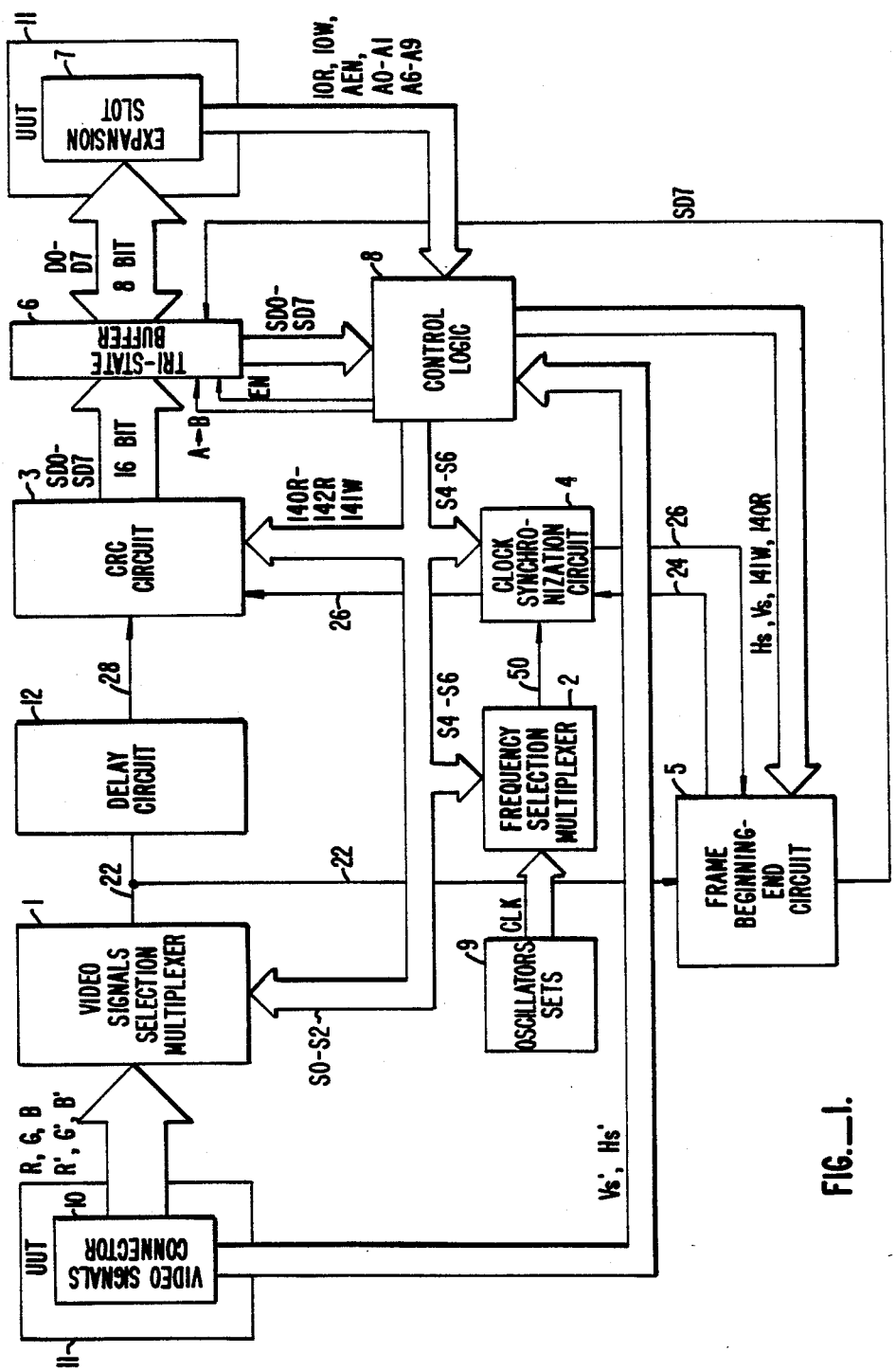

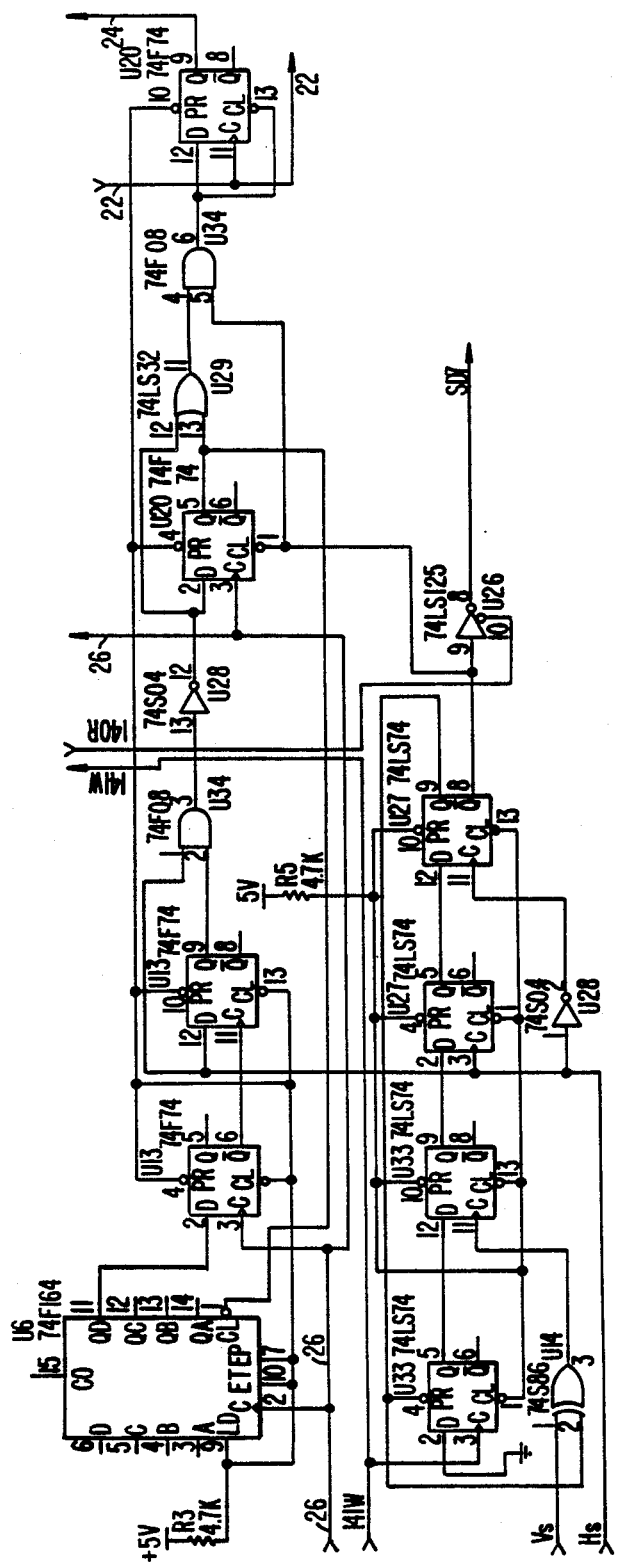
FIG._2.

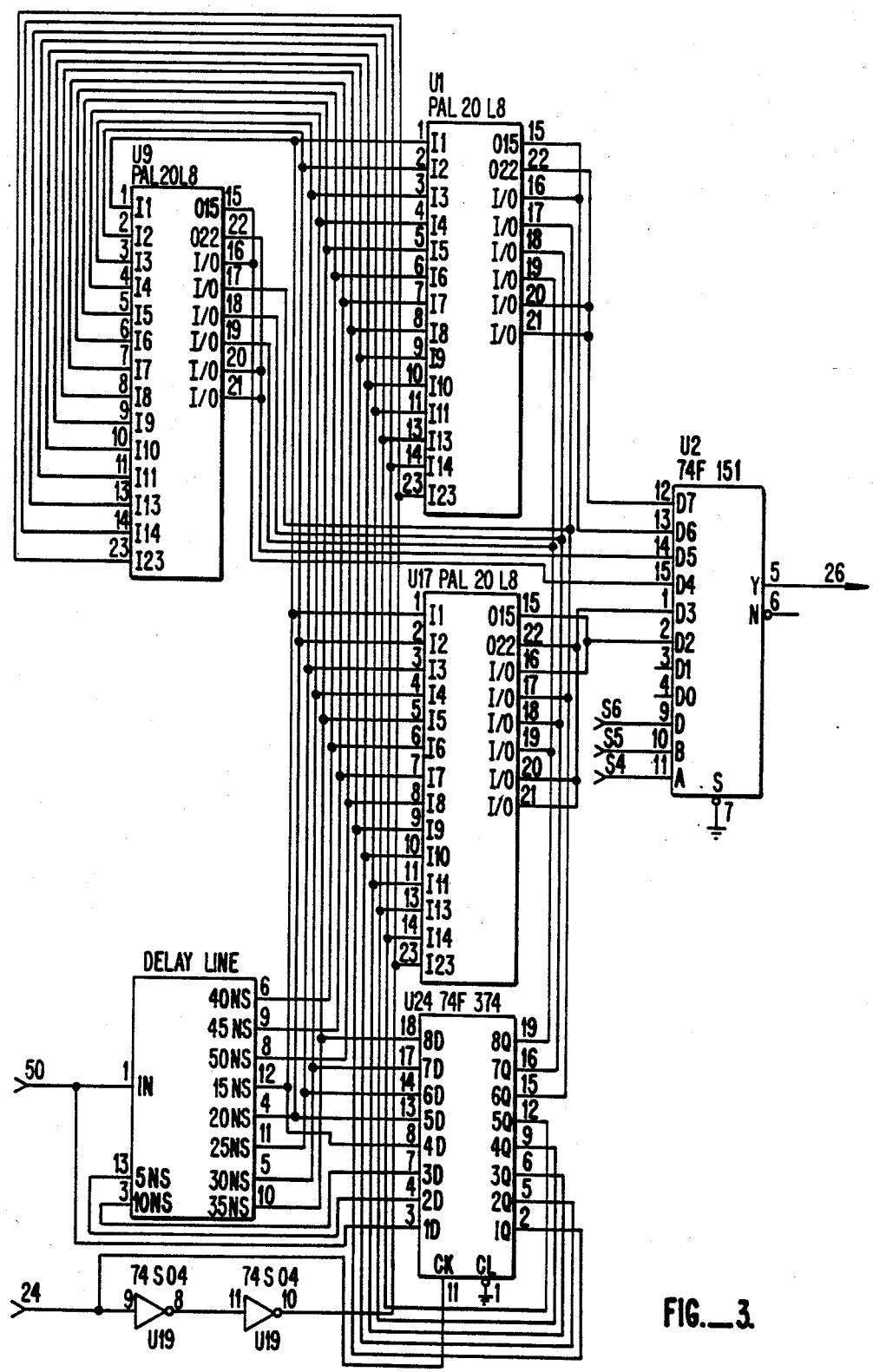
FIG._3.

METHOD AND SYSTEM FOR TESTING VIDEO

BACKGROUND OF THE INVENTION

1. Field of the Invention

A personal computer (PC) must pass a burn-in test and run-in tests after the system is built to assure its quality. Before the burn-in test, the PC may be debugged using automatic testing equipment (ATE), such as GENRAD Model 2275, 2276, etc. After the burn-in test is finished, further functional tests are employed again to further ensure the product's reliability.

2. Description of the Prior Art

It is necessary to have diskette drive, monitor, and keyboard when functional tests are performed. The testing software program is retrieved from a diskette into the random access memory (RAM) of the unit under test (UUT) for execution. Commands are entered from the keyboard and the testing process is viewed using a monitor. Among many functional tests, the purpose of the video signals test is to debug various video signals of UUT, including the vertical sync and horizontal sync signals.

At present, the engineer connects a video signal interface to the monitor and inspects the predesigned full-frame display by naked eye to judge the quality and correctness of the video signals. The efficiency of this method is low. Furthermore, each different engineer has his own judgment and his own vision. Thus, the testing results can be inconsistent and inaccurate.

SUMMARY OF THE INVENTION

This invention overcomes the defects of aforesaid method and provides a video signal testing system and method through which the result of the testing is compared with a built-in reference value without the inaccuracies of human vision and judgment.

Like other functional test programs, the testing software of this invention may be stored on the diskette or in an erasable programmable read only memory (EPROM) in an expansion card of UUT. After rest of UUT, the testing software is transferred into the RAM of the UUT for execution, and the video signals are supplied from the video interface through the video connector.

The standard reference values corresponding to the satisfactory testing full-frame displays are saved in the testing software for comparison. Those values are obtained by running a known error-free UUT several times (without the comparison steps), and then storing the results in a built-in reference table in the testing software for future comparison purposes.

This invention includes a tri-state buffer connected with the data bus of the expansion slot of the UUT for two-way communication. Other well-known signals like IOR, IOW, AEN, A0-A1, A6-A9, are supplied to the control logic means of this invention, as are the data signals SD0-SD7 from the tri-state buffer, the horizontal sync Hs', and vertical sync Vs' from the video signals connector of the UUT.

The testing software transfers the initial status signals, such as the phases of the horizontal and vertical syncs, the system frequency selected, and read/write control signals to the control logic means through the IOR, IOW, AEN, A1-A2, A6-A9, and data bus lines of the expansion slot of the UUT. This enables the control logic means to supply the video select signal to video select multiplexer means, and to supply the frequency select signal to the frequency select multiplexer means and the clock synchronization circuit. The control logic also supplies the start-up LOW level signal to the cyclic redundancy check (CRC) circuit, and the standard horizontal Hs and vertical Vs sync signals as well as start-up signal to the frame beginning-end (FBE) circuit, and the A→B directional and EN active signals to tri-state buffer.

After the start-up LOW level signal causes the CRC circuit to initialize, the start-up signal becomes HIGH and remains HIGH. The start-up HIGH level signal enables the FBE circuit. After the first vertical and horizontal sync signals Vs, Hs appear, when the first horizontal sync HS goes from HIGH to LOW, the FBE circuit sends a detection HIGH signal to the tri-state buffer. This notifies the control logic means that the FBE circuit is beginning the video detections.

When the first R, G, B, R', G' or B' video signal has entered the FBE circuit, the FBE circuit outputs a clock enable HIGH signal to clock synchronization circuit, causing the clock synchronization circuit to output a sync clock to the FBE and CRC circuits which is synchronous in frequency and phase with the video signals from UUT.

The R, G, B, R', G', or B' video signals are also sent to a delay circuit and therefrom clocked into the CRC circuit by the sync clock; therefore, one sync clock samples one video signal into the CRC circuit.

As long as the horizontal sync signal Hs remains LOW, the sync clocks cause the CRC circuit to read the video signals. After the horizontal sync signal Hs becomes HIGH again (N=2,3, . . . ), the FBE circuit outputs the clock enable LOW signal to the clock synchronization circuit. This occurs after the sync clock has been sent out for 16N+2 (N=1,2, . . . ) times, causing the clock synchronization circuit to stop outputting the sync clock and cease video signal detection. After the period of nondetection, and after the horizontal sync signal Hs becomes LOW (N=2,3, . . . ), the FBE circuit outputs the clock enable HIGH signal to clock synchronization circuit again when the video signals come into the FBE circuit anew, causing the FBE circuit to output the sync clock to CRC circuit to read the video signals once again. That is to say, whenever the pulse of the horizontal sync Hs appears once, the sync clock will be stopped after it has been sent out 16N+2 (N=1,2 . . . ) times. After being stopped, the sync clock will start again to the CRC circuit to read the video signals when the video signals come into the FBE circuit again.

In this way, the CRC circuit can be driven by the steady sync clocks and have a fixed output value when the same video signals are input. After the R signals of a specified testing full-frame are entirely input, the vertical sync signal Vs appears HIGH (N=2,3, . . . ), and the FBE circuit outputs the detection LOW signal to let the control logic means know that the R signals of one full-frame are completed. After the R signals are completely detected, the procedure is repeated for G signals, B signals, R' signals, G' signals, and then B' signals. For the corresponding signals like G signals, . . . , B' signals, etc., the above description also applies.

Upon receipt of the detection LOW signal, the control logic means outputs the read-out signals to the CRC circuit to cause it to output respectively the 16 bits of CRC circuit to tri-state buffer. Thereby the output of the CRC circuit is input into the data bus of the expansion slot, and then to the RAM of the UUT for comparison with the reference value of the testing software. If the signal meets the criterion, the video signals of the corresponding full-frame are considered error-free, and the control logic means outputs the start-up LOW signal to the CRC circuit to revert to its initial status. If the video does not meet the criterion, meaning the video signals have errors, an error code will be generated and the video signal testing stops.

BRIEF DESCRIPTION OF THE DRAWINGS

FIG. 1 is a main block diagram of this invention.

FIG. 2 is detailed diagram of the frame beginning-end (FBE) circuit.

FIG. 3 is the detailed diagram of the clock synchronization circuit.

DETAILED DESCRIPTION OF THE PREFERRED EMBODIMENTS

Like other functional test programs, the testing software of this invention may be stored on a diskette or in an erasable programmable read only memory (EPROM) or other memory on an expansion card of UUT 11. After reset of UUT 11, the testing software is transferred into the RAM of UUT 11 for execution, and the video signals are supplied from the video interface through the video connector 10.

Referring to FIG. 1, this invention comprises a video signal selection multiplexer 1 for receiving the video signals from the video signals connector 10 on the unit under test (UUT) 11, such as R, G, B, or R', G', B' signals, and supplying the serial video signals 22 to the delay circuit 12 and frame beginning end (FBE) circuit 5. Through the video signals connector 10, the horizontal and vertical sync signals Hs' and Vs' of the video signals are also supplied to the control logic means 8.

This invention has a tri-state buffer 6 connected to the data bus D0-D7 of the expansion slot 7 for two-way transmissions. The initial instructions of the testing software can be supplied to the buffer 6 and then to the control logic-means 8 through the SD0-SD7 data lines. These signals include the selection signals S0-S2 for selecting one of the R, G, B, R', G', B' signals and the phase status of the entering horizontal sync Hs', and vertical sync Vs'. The address signals and the read/write control signals IOR, IOW on the expansion slot 7 are also supplied to the control logic means 8.

The control logic means 8 supplies the S0-S2 video select signals to video selection multiplexer for selecting one of the R, G, B, R', G', or B' signals to enter the delay circuit 12 and the FBE circuit 5. Control logic 8 also supplies the S4-S6 frequency selection signals to the frequency selection multiplexer 2 for selection of one of the clocks from the oscillator sets 9. The control logic means 8 also supplies the S4-S6 frequency selection signals to the clock synchronization circuit 4 causing it to output a sync clock 26 which is synchronous in frequency and phase with the video signals from the UUT 11. Additionally, logic 8 supplies start-up 141W LOW signal to the CRC circuit 3 to reset it to its initial state. After the reset action is completed, the 141W signal becomes HIGH and remains HIGH until the next signal cycle. The 141W signal is also used to enable the FBE circuit 5.

The control logic means 8 standardizes the horizontal and vertical sync signals Hs', Vs', and supplies the resulting HIGH Vs, Hs signals to the FBE circuit 5. The control logic means 8 sends a 141W HIGH signal to enable the FBE circuit 5. After the first vertical and horizontal sync signals Vs, Hs appear at the said time, the FBE circuit 5 outputs the detection SD7 signal HIGH to tri-state buffer 6, under the control of the 140R signal sent by the control logic means 8, when the first horizontal sync Hs becomes LOW, this causes the SD7 signal to enter control logic means 8 notifying it that the video signal's detection has begun by the FBE circuit 5.

When the first R video signal 22 has entered the FBE circuit 5, the FBE circuit 5 outputs a clock enable HIGH signal 24 to clock synchronization circuit 4, and uses the clock signal 50, input from the frequency selection multiplexer 2, as the input. The programmable logic array (PLA) of the clock synchronization circuit 4 will determine which delayed clock is synchronous in phase with the video signals of the UUT 11 and output the sync clock 26 to the FBE circuit 5 and CRC circuit 3.

The video signal 28, being the output of the delay circuit 12, enters the CRC circuit 3 at the same time as the sync clock 26 enters the CRC circuit 3. In this way, one sync clock 26 can sample one video signal. The purpose of the FBE circuit 5 is to detect the full-frame video from the first video signal to the last video signal.

Referring to FIG. 2, as the software instruction causes line 141W to change from LOW level to HIGH level, the chip U33 pin 5 becomes LOW. As the vertical sync signal Vs changes from LOW to HIGH level, the U33 pin 9 becomes LOW. At the same time, the horizontal sync signal Hs changes from LOW to HIGH level also, so the U27 pin 5 becomes LOW. As the horizontal sync signal Hs changes from HIGH to LOW level, the U27 pin 8 becomes HIGH causing the U34 pin 6 to go HIGH.

As the first R video signal 22 enters the CLOCK pin of the U20, pin 11 of U20 receives a pulse causing pin 9 of U20 to output a clock enable HIGH signal 24 to clock synchronization circuit 4. Using the clock enable HIGH signal 24 as the input, the sync clock 26, synchronous in frequency and phase with the video signals of UUT 11, is generated.

The FBE circuit 5 includes a divide-by-16 chip U6. After 16N (N=1,2, . . . ) of sync clocks 26 have been generated, the U6 pin 11 finishes a cycle, and as the 16N+1 (N=1,2, . . . ) sync clock 26 enters U6, pin 6 of U13 becomes HIGH triggering the pin 11 of U13 to become HIGH. If the horizontal sync signal Hs remains LOW at this moment, the U13 pin 9 goes LOW, so the U34 pin 3 goes LOW and U28 pin 12 goes HIGH. As the 16N+2 th (N=1,2, . . . ) sync clock 26 appears, U20 pin 5 is HIGH, and it will not change the status of its downstream elements. That is to say, as long as the horizontal sync signal Hs remains LOW, the clock enable signal 24 remains HIGH causing the clock synchronization circuit 4 to supply sync clocks 26 to CRC circuit 3 for reading the video signals.

When the horizontal sync signal Hs becomes HIGH once again (N=2,3, . . . ), the U13 pin 12 becomes HIGH. After the U6 has processed the 16N+1 th (N=1,2, . . . ) clock, the pin 9 of U13 goes HIGH, and the pin 12 of U28 goes LOW. After the U6 has processed the 16N+2 (N=1,2, . . . ) clock, the pin 5 of U20 goes LOW, pin 11 of U29 goes LOW, pin 6 of U34 goes LOW, pin 12 of U20 receives the LOW signal, that is, a CLEAR enable signal to the pin 12 of U20. Thus, the pin 9 of U20 supplies clock enable LOW signal 24 to clock synchronization circuit 4 causing it to stop sending the sync clock 26 and thereby cease reading the video signals 28. Next, after the horizontal sync signal Hs becomes LOW (N=2,3, ... ), the FBE circuit 5 outputs the clock enable HIGH signal 24 to clock synchronization circuit 4 when the video signals 22 come into the FBE circuit 5. This causes the FBE circuit 5 to output the sync clock 26 and CRC circuit 3 to read the video signals 28 once again. Whenever the pulse of horizontal sync Hs appears once (N=2,3, ... ), the sync clock 26 will be stopped after it has been sent out 16N+2 times. After being stopped, the sync clock 26 will be sent once again to the CRC circuit 3 to read the video signals 28 when the video signals 22 come into the FBE circuit 5 again. Thus, the CRC circuit 3 can be driven by the steady sync clocks 26 and have a fixed output value when the same video signals 22 are input.

Referring to FIG. 3, after the clock enable signal 24 enters the clock synchronization circuit 4, being delayed for about 10 ns by two buffers U19, the clock enable signal 24 enters pin 23 of three PLA chips acting as chip enable signal. Meanwhile, the clock enable signal 24 enters U24 as a latch enable signal before being delayed.

As the clock 50, which has the same frequency as the video signals of the UUT, enters the clock synchronization circuit 4 from the frequency selection multiplexer 2, it is delayed respectively 0 ns, 5 ns, 10 ns, 15 ns, 20 ns, 25 ns, 30 ns, 35 ns by the delay-line chip and therefrom output to the latch U24. On the threshold of the clock enable HIGH signal 24, the latch U24 latches each phase-delayed clock pulse. The PLAs determine which delayed clock is synchronous in phase with that of the video signals, depending on the latched phase status, and output the same to the multiplexer U2 and then output the sync clock 26 under the control of the frequency selection signals S4–S6. There are three PLAs in FIG. 3 because several kinds of oscillators are used in the generation of video signals, and each different oscillator must have its own PLA.

After the R signals are completely detected, the procedure continues for G signals, B signals, R' signals, G' signals, then B' signals. As the R signals of a specified testing full-frame are entirely input, the vertical sync signal Vs appears HIGH (N=2,3, ... ), and the FBE circuit 5 supplies the detection SD7 LOW signal. This lets the control logic means 8 know the R signals of one full-frame are complete. For signals like G signals, ..., B' signals, etc., the above description also applies.

Referring back to FIG. 1, after receiving the SD7 LOW signal, the control logic means 8 sends the readout 141R, 142R enable signals to the CRC circuit 3 to input respectively the 16 bits output of the CRC circuit 3 to tri-state buffer 6. Thereby the output of CRC circuit 3 is placed onto the data bus D0–D7 of the expansion slot, and then the RAM of the UUT for comparison with the reference value of the testing software. If it meets the criterion, the video signals 22 of the corresponding full-frame are considered error-free, and the control logic means 8 outputs the start-up 141W LOW signal to the CRC circuit 3 to revert to its initial status. If it does not meet the criterion, indicating that the video signals 22 have errors, the error code will be generated and testing stops at this point.

It should be noted that in this embodiment a 17-bit CRC circuit is used. One bit of the 17 bit output of CRC circuit 3 is discarded and the left 16 bits output are received respectively using the read-out 141R, 142R signals. Of course, different bits of the CRC circuit also can be used.

After the video signals of one full-frame test free of error, than the testing software sends the next scheduled full-frame to video connector 10 and sends out the initial status of this new full-frame signal to control logic means 8 through data bus D0–D7 and the tri-state buffer 6. The aforesaid procedures apply to this new full-frame. The procedure goes from one full-frame to another, if each full-frame signal is error-free, until the entire prescheduled testing is completed. The testing will be stopped if errors of one full-frame video signals encountered.

I claim:

1. A video signal testing system for connecting with a data bus of an expansion slot of a unit under test for two way data transmissions for receiving IOR, IOW, AEN, and address signals therefrom, and for receiving video signals from a video connector, wherein the system comprises:
   tri-state buffer means connecting with the data bus of the expansion slot of the unit under test for two-way data transmissions under control of input ENABLE and DIRECTION signals;
   control logic means for receiving data signals from the tri-state buffer means, the IOR, IOW, AEN and address signals from the expansion slot of the unit under test, and for supplying horizontal and vertical sync signals, the ENABLE signal and DIRECTION signal to the tri-state buffer, and supplying a start-up signal and read-out signals;
   an oscillator set for supplying clock signals corresponding to the testing video signals;
   a frame beginning-end circuit for detecting the completion of the video signals of a full-frame in response to the horizontal sync and vertical sync signals, the start-up signal, the read-out signals, and video signals, and for supplying the detection signal to the tri-state buffer;
   clock synchronization circuit for generating a sync clock which is synchronous in frequency and phase with the video signals of said unit under test in response to the clock signals from the oscillator set and the clock enable signal from the frame beginning-end circuit;
   delay circuit connected to receive video signals from the video connector and supply the video signals, after being delayed for a specific amount of time; and
   cyclic redundancy check circuit for receiving the start-up signal from the control logic means, video signals from the delay circuit and the sync clock from the clock synchronization circuit, wherein the video signals and sync clock enter the cyclic redundancy check circuit substantially at the same time causing one sync clock to sample one video signal, and wherein a fixed value is supplied to the tri-state buffer under the control of the read-out signals.

2. A method for testing video comprising:
   supplying the video signals of the frame to be tested to a testing video signals connector;
   supplying a start-up signal to a cyclic redundancy check circuit to initialize it;
   using the cyclic redundancy check circuit to input all discrete video signals of the frame to be tested and generating a fixed value corresponding to the frame; and
   comparing the fixed value with a stored value.

* * * * *